No. 771,275. PATENTED OCT. 4, 1904.
F. A. SCHLUNS.
DEVICE FOR DRESSING STONE.
APPLICATION FILED NOV. 21, 1903.
NO MODEL.

Witnesses:
Fred S. Greenhalgh.
Warren D. Owen

Inventor,
Friederick A. Schluns,
by Crosby & Gregory
attys.

No. 771,275.

Patented October 4, 1904.

UNITED STATES PATENT OFFICE.

FRIEDERICK AUGUST SCHLUNS, OF REVERE, MASSACHUSETTS.

DEVICE FOR DRESSING STONE.

SPECIFICATION forming part of Letters Patent No. 771,275, dated October 4, 1904.

Application filed November 21, 1903. Serial No. 182,046. (No model.)

*To all whom it may concern:*

Be it known that I, FRIEDERICK AUGUST SCHLUNS, a subject of the Emperor of Germany, and a resident of Revere, in the county of Suffolk and State of Massachusetts, have invented an Improvement in Devices for Dressing Stone, of which the following description, in connection with the accompanying drawings, is a specification, like numerals on the drawings representing like parts.

This invention has for its object the production of a novel device for dressing and shaping stone, and has been especially designed for use on hard stones, such as granite, although it can also be used in shaping soft stone.

Heretofore, so far as I am aware, hard stone like granite has been dressed or shaped either by handwork or by a cutter or tool which strikes the face of the stone being finished a series of blows delivered in a direction substantially at right angles to said face. In my improved machine I depart from this practice and provide a power-operated cutter which reciprocates rapidly in a plane parallel to the face of the stone which is being finished and delivers a series of blows which chip off the portion of the stone to be removed and at the same time has a gradual movement relative to the stone, also in a direction parallel to the face being finished.

The device comprises a carriage slidably mounted on ways and carrying an engine or motor and a stone-dressing tool or cutter which is operatively connected to the engine and is guided in its reciprocations by the carriage. The cutter is preferably provided with a detachable cutting-blade which has the shape desired to give to the stone, the detachability of said blade enabling me to apply to the tool or cutter blades of different contour or shape. By having a set of differently-shaped blades the same machine may be used for cutting a great variety of shapes by simply changing the blades on the tool.

Figure 1:
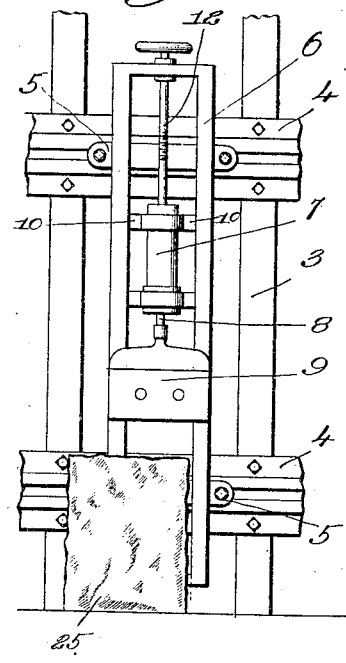
Figure 2:
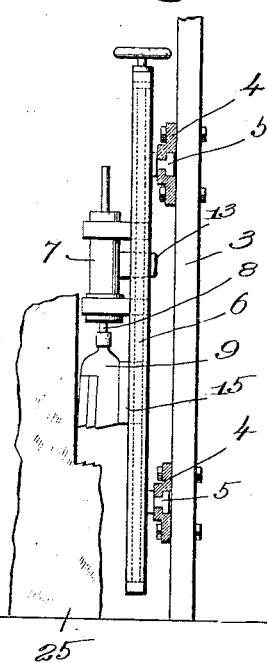
Figure 3:
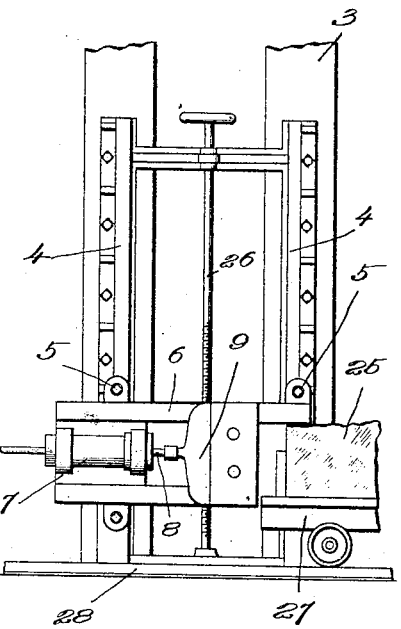
Figure 4:
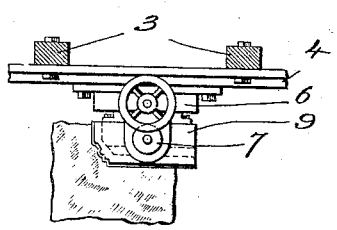
Figure 5:
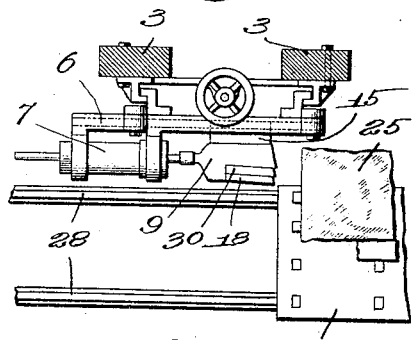
Figures 6, 7, 8:
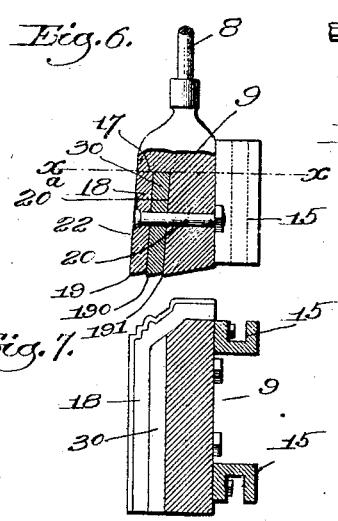

Figure 1 is an elevation showing one form of my invention. Fig. 2 is a side view of Fig. 1. Fig. 3 is an elevation showing a modified form of the invention. Fig. 4 is a top plan view of Fig. 1. Fig. 5 is a top plan view of Fig. 3. Fig. 6 is an enlarged view of the cutting-tool, part thereof being broken out to better show the construction. Fig. 7 is a section on line $x\,x$, Fig. 6. Fig. 8 shows a different form of cutter.

In Figs. 1 and 2, 3 designates a suitable framing or support having ways 4 thereon in which slide the runners 5 of a carriage 6. 7 designates a prime mover which is adjustably mounted upon the carriage. This prime mover may be of any suitable construction, and, as herein shown, it is in the form of an engine and comprises an ordinary cylinder containing a piston, the piston-rod 8 of which is connected to the cutting or dressing tool 9. The piston may be operated by steam, compressed air, or any other suitable motive fluid, and the engine is so constructed as to give the tool 9 a reciprocating motion and cause it to strike the stone a series of blows. The engine is provided with the guide-arms 10, which are received in suitable guideways 11 in the carriage 6, and an adjusting-screw 12, carried by the frame and operating through a fixed nut 13 on the engine, serves to adjust the engine on the frame. The cutting-tool has on its back the guides 15, which preferably extend to the cutting edge of the tool and which play in the guideways 11, said guides and guideways serving to hold the cutting-tool in a right line during its reciprocating movement, as will be more fully hereinafter described. The cutter 9 is preferably provided with a detachable cutting-blade 18, having a cutting edge 19 of the contour which it is desired to give to the dressed face of the stone, said blade being detachably secured to the tool-body in any suitable way, as by bolts 20. In this form of my invention the blade 18 is retained in a recess 17 in the side of the cutter 9, though it could be secured to the tool in any other suitable way without departing from my invention. The form of the blade shown in Fig. 7 extends across the front of the tool and around one end; but it is my purpose to have a plurality of blades of different shapes, any one of which can be used, depending on the contour or shape it is desired to give to the stone. 30 designates a filling-piece, which may also have a cutting edge 190, and I preferably provide the end of the body with a cutting edge 19¹. In the form of my invention shown in Fig. 1 the carriage 6 is arranged to have a longitudinal movement, and the engine is mounted for vertical movement on the carriage. During the operation of the engine the tool 9 is reciprocated vertically with a series of quick short strokes. This device differs from other stone-dressing machines with which I am familiar in that it operates to dress or finish the vertical face of the block of stone 25 instead of the top face thereof. In operation the block 25, of stone, is first brought into proper position, the carriage adjusted in its ways, and the engine adjusted on the carriage, so as to bring the cutting-tool into its operative position. When the engine is started, the tool is reciprocated in a plane parallel to the face of the stone on which the tool is operating, and the cutting edges of the tool are thus brought against the block with a series of quick blows. At the same time the engine is gradually lowered by means of the screw 12, and the tool thereby operates to chip off and smooth up the vertical face by blows, which are delivered parallel to said face. It is very important that the tool should not be allowed to spring away from the face when the blow is struck, for otherwise the finished face would not be exactly perpendicular, but would have an uneven surface. I accomplish this by extending the guides 15 on the tool clear to the cutting-face thereof, so that the tool is supported against side pressure from its cutting edge throughout its extent. This is one of the important features of my invention, because it prevents the tool from springing, and thus insures a smooth finished surface. Another important feature of my invention lies in the fact that the cutting-blades are backed by the tool throughout their entire extent. Upon referring to Fig. 6 it will be seen that said blades do not extend below the body of the tool, and thus cannot yield or give when the blow is struck. It will be seen that the tool has two movements, a reciprocating movement, caused by the operation of the engine, and a gradual downward movement from the top to the bottom of the stone with the engine, and that both movements are parallel to the face of the stone on which the tool is operated. In order to provide the necessary clearance, I give the outer face 22 of the blade a slight inclination to the direction of movement of the tool, as best seen in Fig. 6, this being herein accomplished by giving the wall 20ª of the recess the same inclination and making the blade 18 and filling-piece with parallel sides. I prefer this construction, because it obviates the necessity of making the blade tapering in width.

In Figs. 3 and 5 I have shown another form of my invention, wherein the carriage is mounted for vertical movement upon the framing 3 and the engine 7 is rigidly secured on the carriage. In this form of the invention the carriage will have a fixed nut thereon, in which operates an adjusting-screw 26 for the purpose of raising or lowering the carriage, as desired.

To get the necessary relative movement between the stone and the engine in a direction parallel to the dressed face, I have mounted the block of stone 25 upon a carriage 27, which can be moved horizontally upon a track 28 as fast as the cutting operation proceeds.

The object in making the cutter 9 with the removable cutting-blade 18 is to provide a single cutter which can be used for giving a great variety of shapes to the stone.

While I prefer to use the cutter with the detachable blade, yet this is not essential, as a cutter with the cutting edge made integral therewith, as shown in Fig. 8, would come within my invention. In this case, however, it would be necessary to remove the entire cutter and substitute a new one whenever it was desired to cut a different shape on the stone.

While I have herein shown two forms of my invention, I do not wish to be limited to the exact constructions illustrated, as these may be varied without departing from the spirit of the invention expressed in the appended claims.

Having fully described my invention, what I claim as new, and desire to secure by Letters Patent, is—

1. In a stone-dressing machine, a cutter, means operatively connected thereto for reciprocating the same in a direction parallel to the face of the stone on which the cutter is operated, and means to prevent the cutting edge of the tool from springing away from the stone as it strikes the latter.

2. In a stone-dressing machine, a cutting-tool, means to reciprocate the same in a direction parallel to the face of the stone on which the tool operates, and guides extending to the cutting end of the tool whereby the cutting edge is prevented from springing away from the stone when the blow is struck.

3. In a stone-dressing machine, a cutting-tool, means to give the tool a series of blows delivered in a direction parallel to the face of the stone on which said tool is working, and guides for the tool extending from the cutting end thereof.

4. In a stone-dressing machine, a carriage having ways, a stone-dressing tool having guides operating in said ways, said guides extending to the cutting end of the tool, and an engine for reciprocating said tool in a direction parallel to the face of the stone on which the tool is working.

5. In a stone-dressing machine, a carriage having ways, a stone-dressing tool having guides operating in said ways, said guides extending to the cutting end of the tool, and an engine for reciprocating said tool in a direction parallel to the face of the stone on which the tool is working, and means for moving the engine simultaneously in the same direction.

6. In a stone-dressing machine, a carriage having ways, a stone-dressing tool having guides operating in said ways, said guides extending to the cutting end of the tool, and an engine for reciprocating said tool in a direction parallel to the face of the stone on which the tool is working, said tool having a detachable blade.

7. A stone-dressing tool comprising a body or stock having a recess in one side and a cutting edge at one end, and a blade detachably retained in said recess and provided with a cutting edge.

8. A stone-dressing tool, comprising a body or stock having a recess in one side, guides projecting from the opposite side, and a cutting-blade detachably retained in said recess and supported throughout its entire extent by the walls of the recess.

9. In a stone-dressing machine, a cutting-tool, means to reciprocate said tool parallel to the face of the stone on which it operates, and a support on which said tool is carried and by which it is guided, the contact between the tool and support extending to the cutting end of the tool.

In testimony whereof I have signed my name to this specification in the presence of two subscribing witnesses.

FRIEDERICK AUGUST SCHLUNS.

Witnesses:
 LOUIS C. SMITH,
 GEO. W. GREGORY.